July 4, 1939.  F. S. TRAVIS  2,164,759
SPROCKET ASSEMBLY FOR BICYCLES
Filed Feb. 18, 1938  2 Sheets-Sheet 1
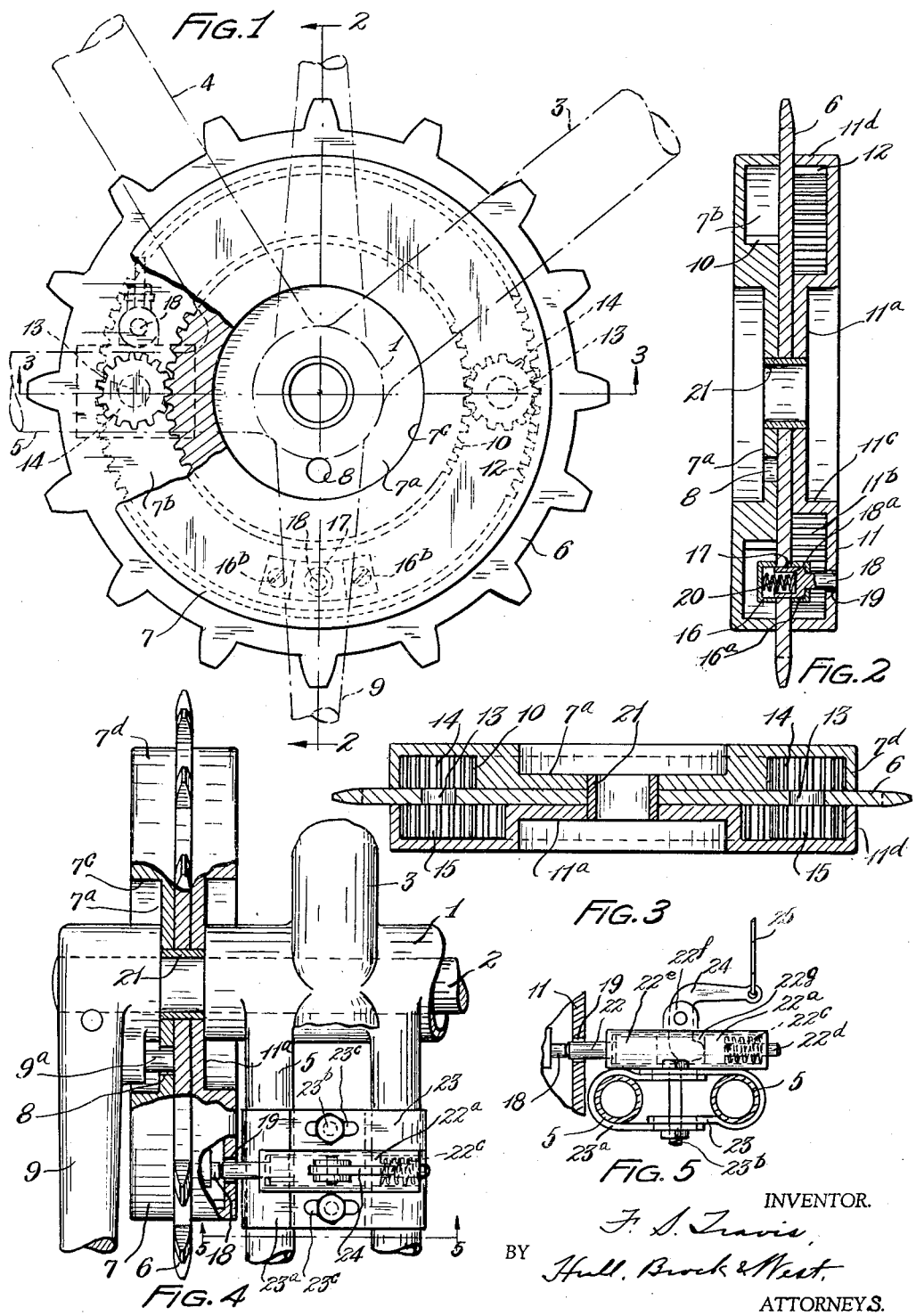
INVENTOR.
F. S. Travis,
BY Hull, Brock & West,
ATTORNEYS.

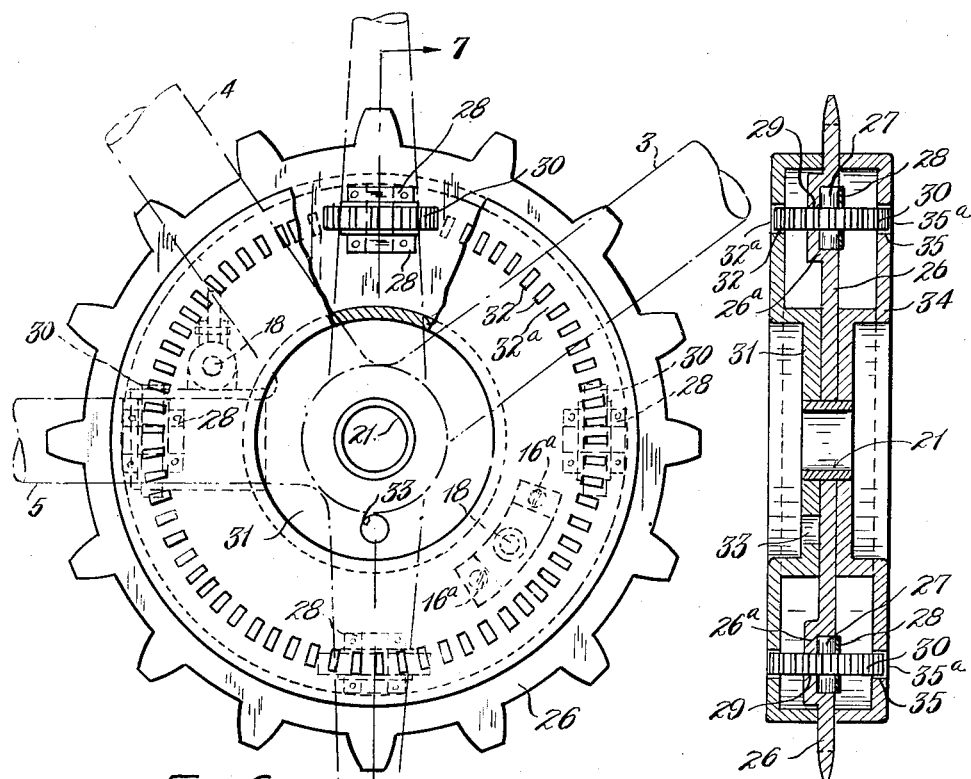
Fig. 6
Fig. 7
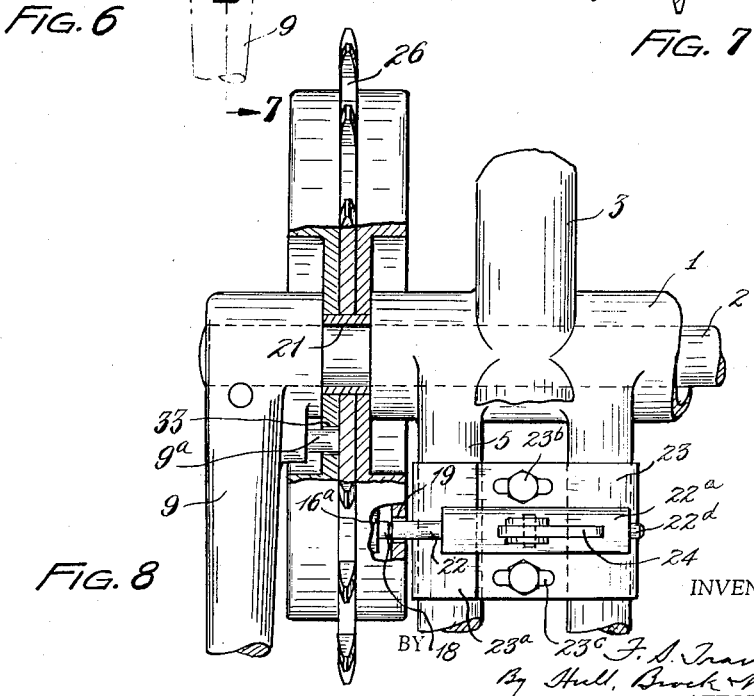
Fig. 8

Patented July 4, 1939

2,164,759

UNITED STATES PATENT OFFICE 2,164,759

SPROCKET ASSEMBLY FOR BICYCLES

Frederick S. Travis, Cleveland, Ohio, assignor of one-half to Edward M. Spelman, Cleveland, Ohio Application February 18, 1938, Serial No. 191,247

13 Claims. (Cl. 74—291)

This invention relates to change-speed mechanism which is particularly adapted for use in connection and in combination with the front or driving sprockets of bicycles. The general object of the invention is to provide a self-contained sprocket assembly which will enable the speed at which the sprocket is driven from the crank shaft to be conveniently reduced, as when the rider encounters severe head winds or is climbing a stiff grade.

A further object of the invention is to provide a self-contained change-speed sprocket construction which is simple in construction, economical of production and which will function efficiently to realize the purpose for which it is desired.

A still further object of the invention is to provide a construction of this character which can be applied to existing bicycles without any change therein except for the addition thereto of a simple reciprocable locking pin. My invention also is capable of being utilized as a substitute for standard sprockets in the regular manufacture of bicycles.

I accomplish the foregoing objects in and through the construction and arrangement of parts shown in the drawings hereof, wherein Fig. 1 represents a side elevation of one form of my sprocket assembly, with parts broken away, the crank shaft arms and the diagonal tubes extending from the hub being shown in broken lines; Figs. 2 and 3 are details in section through the sprocket assembly, said views being taken respectively on the lines 2—2 and 3—3 of Fig. 1; Fig. 4 is a front elevation through the rear, with parts broken away, of the sprocket construction and of the parts of the hub and frame adjacent thereto; Fig. 5 a detail in section through the rear forks, showing the means for anchoring the inner member of my assembly; Fig. 6 is a view, similar to Fig. 1, showing a modification of my invention; Fig. 7 a detail in section corresponding to the line 7—7 of Fig. 6; and Fig. 8 a view, similar to Fig. 4, of the said modification.

Describing the parts by reference characters, and first in connection with the construction shown in Figs. 1 to 4 inclusive, 1 denotes the crank hanger, 2 the crank shaft, 3 and 4 the upwardly extending tubes of the frame and 5 the rear forks extending from the crank hanger 1.

6 denotes a front sprocket which is of conventional construction, except for the comparatively slight changes therein which will be pointed out hereinafter. This sprocket constitutes the central or intermediate member of the assembly or unit, the other parts of which will now be described. 7 denotes the external member of the unit, the said member being in the form of a circular disk of smaller diameter than the sprocket and having the central portion $7^a$ pressed inwardly thereby to engage the central portion of the sprocket member 6, while its outer portion is formed into an annular chamber $7^b$, the chamber being preferably provided between an inner cylindrical wall $7^c$ and an outer cyindrical wall $7^d$, the inner edges of said chamber engaging the adjacent outer face of the sprocket member 6. The member 7 is provided with a driving aperture 8 which is adapted to receive the usual driving pin $9^a$ which is carried by the outer crank arm 9. The inner cylindrical wall $7^c$ of the chamber $7^b$ is provided with a spur gear 10 concentric with the shaft 2.

11 denotes the inner member of my assembly, this member being of the same shape as the outer member and having the depressed central portion $11^a$ which is adapted to engage the inner face of the sprocket member 6, the annular chamber $11^b$, and the inner and outer cylindrical walls $11^c$ and $11^d$, the outer edge of the wall $11^d$ engaging the inner face of the sprocket 6. Projecting into the the chamber $11^b$ from the outer wall $11^d$ is an internal gear 12 concentric with the shaft 2.

Rotatably mounted in the sprocket member 6 are shafts 13, said shafts extending into the chambers $7^b$ and $11^b$ and each having pinions 14 within the former chamber, meshing with the gear 10 therein, and pinions 15 in the chamber $11^b$ meshing with the internal gear 12 therein.

16, $16^a$ denote a cage formed in sections secured to opposite sides of the sprocket member 6, as by screws $16^b$, the sprocket member having an aperture 17 therethrough, the opposite ends of said aperture being surrounded by the cage sections. 18 denotes a locking pin extending through an opening in the cage section $16^a$ and adapted to extend through an aperture 19 in the inner member 11. This pin is provided with a cupped end $18^a$ extending through the aperture 17 and receiving therein one end of a spring 20 whereby it is normally held in the position shown in Fig. 2.

The sprocket assembly thus far described is shown as applied to the crank shaft 2, the registering central openings of the elements thereof having therein a common bushing 21.

With the parts constructed and arranged as thus far described, the bicycle equipped with my sprocket assembly can be driven in the usual manner and with no reduction of speed, since there is no relative movement between the sprocket element 6 and the other elements of the assembly.

For the purpose of reducing the speed of rotation of the sprocket 6, I mount upon a convenient part of the frame a pin which is adpated to enter the aperture 19 in the inner disk member, displacing the pin 18 from said aperture and anchoring the said member against rotation. This pin, indicated at 22, is carried by a plunger 22ᵉ slidably mounted in a cylinder 22ᵃ, welded or otherwise suitably secured to the upper surface of one of the two clamping members which are adapted to be fastened to the rear forks 5. Each of these clamp members 23, 23ᵃ is substantially U-shaped, with the ends overlapping between the forks 5 and being secured to said forks by bolts 23ᵇ extending through slots 23ᶜ in said overlapping ends. The clamp members are made of sheet metal and, due to their construction and mode of mounting, can readily accommodate such variations in the diameter and spacing of rear forks as exist in different makes of bicycles. 22ᶜ denotes a spring within the cylinder 22ᵃ, surrounding the pin 22ᵈ extending through the head of the cylinder opposite that through which the pin 22 extends and bearing at one end against the former head and at its other end against the plunger body. This plunger is provided with a slot 22ᵍ extending downwardly from the top thereof, which slot receives one arm of a bell crank lever 24 which is pivoted between lugs 22ᶠ projecting upwardly from the cylinder 22ᵃ, the other arm of which has connected thereto a wire or other suitable flexible member 25, the opposite end of which is located in a position rendering it conveniently accessible to the rider.

As will be noted, the spring 22ᶜ tends to force the outer end of the pin 22 into engagement with the inner sprocket member 11, hence the wire or cable 25 will normally have its upper end anchored in such manner as to hold the pin 22 in its retracted position. When, however, it is desired to lock the inner member 11 against rotation, by slacking or otherwise releasing the tension on the wire or cable 25, the spring 22ᶜ, being stronger than the spring 20, will enable the pin 22 to displace the pin 18 from the aperture 19 in the manner shown more particularly in Figs. 4, 5 and 8, such displacement being facilitated by rounding the outer end of the pin 22. The inner member of the sprocket assembly having been thus locked against rotation, the sprocket member 6 will be driven at reduced speed owing to the reduction effected through the gears 10 and 12 and the pinions 14 and 15. When it is desired to drive at full speed, the operator pulls the wire or cable 25 upwardly, thereby withdrawing the locking pin 22 from the aperture 19, and the pin 18 will then enter said aperture as soon as brought into register therewith.

The construction shown and described hereinbefore may be readily and conveniently substituted for the front sprockets with which bicycles have been originally equipped as well as being capable of ready application to bicycles in the course of their original construction. Furthermore, the sprocket assembly is capable of prolonged use without appreciable deterioration.

In Figs. 6, 7 and 8, I have shown a modification of my invention which, while possessing most of the advantages of the construction shown in the preceding views, lends itself to cheapness of production. In these views, the parts corresponding to those shown in Figs. 1 to 4 will be designated by the same reference characters.

26 denotes the sprocket member of the assembly. As a matter of cheapness of production, this member may be made as a stamping having radial pockets 26ᵃ pressed outwardly therefrom with pinion shafts 27 held against rotation in said pockets by clips 28 which may be spot-welded or otherwise suitably secured to the face of the sprocket from which the pockets have been pressed. The sprocket 26 is also provided with slots 29 intersecting the pockets and extending at right angles to the shafts 27, these slots receiving pinions 30 carried by the shafts 27.

31 denotes the outer member of the sprocket assembly, the same being substantially identical with the member 7 of my prior modification except that, in lieu of the gear 7ᵇ, this member is provided with radial slots 32 between which gear teeth 32ᵃ are provided, these teeth being adapted to be engaged by the teeth on the pinions 30. The outer member 32 is provided with a driving aperture 33, corresponding to the aperture 8 in the preceding views. The inner member of the sprocket assembly is indicated at 34 and, with the exceptions to be noted hereinafter, is the substantial duplicate of the outer member 31. It is provided with a circular gear preferably formed in the same manner as the gear carried by the outer member 31, the radial slots being indicated at 35 and the teeth between the slots being indicated at 35ᵃ. The inner member is provided with the pin 18 and the aperture 19, the construction for mounting and operating this pin being preferably identical with that shown in Figs. 1 and 2.

With the parts constructed and arranged as shown and described, when the pin 18 is in the aperture 19, the sprocket member 26 will be driven at crank shaft speed. When it is desired to reduce its speed with respect to the crank shaft speed, the pin 22 is inserted within the aperture 19, locking the inner member against rotation. The sprocket member 26 will then be driven at half crank-shaft speed through the action of the pinions upon the gears carried by the inner and outer members 31 and 34, respectively.

Having thus described my invention, what I claim is:

1. A variable speed sprocket assembly for bicycles comprising an outer disk member, an intermediate disk member having sprocket teeth thereon, and an inner disk member, the said disk members having central openings therethrough for the passage of the crank shaft and the outer disk member having means whereby it may be driven by the crank pedal, there being annular chambers provided between the first and third disk members and the intermediate member, said chambers being located on opposite sides of the intermediate disk member, one or more shafts extending transversely of and mounted in the intermediate disk member with their ends projecting into the said chambers, a gear carried by one of the chambered disk members within the chamber thereof and concentric with the axis thereof, an internal gear carried by the other chambered disk member within the chamber thereof and concentric with the axis thereof and spaced radially outwardly from the former gear, pinions mounted on the opposite ends of said shaft or shafts and located in the said chambers and cooperating with the said gears respectively, and movable means connecting the intermediate and inner disk members, whereby the inner disk member may be held against rotation.

2. A variable speed sprocket assembly for bicycles comprising an outer disk member, an intermediate disk member having sprocket teeth thereon, and an inner disk member, the said disk members having central openings therethrough for the passage of the crank shaft and the outer disk member having means whereby it may be driven by the crank pedal, there being annular chambers provided between the first and third disk members and the intermediate member, said chambers being located on opposite sides of the intermediate disk member, shafts mounted in the intermediate disk member, a gear carried by the outer disk member and a gear carried by the inner disk member, said gears being located in said annular chambers, respectively, and being concentric with the axes of said disk members, pinions mounted on said shafts and located in the said chambers and cooperating with the said gears respectively, movable means connecting the intermediate and inner disk members, whereby the inner disk member may be held against rotation.

3. In the sprocket assembly set forth in claim 2, the movable means connecting the intermediate and inner disk members comprising a pin slidably supported by the intermediate disk member and an opening in the inner disk member for the reception of said pin, and a spring for yieldingly pressing said pin toward said inner disk member.

4. The combination, with the crank hanger, crank shaft and pedal crank of a bicycle, of a change-speed sprocket assembly mounted upon said shaft, the said sprocket assembly comprising an outer disk member having an annular chamber between the central and peripheral portions thereof; a sprocket disk member; and an inner disk member also having an annular chamber formed between the central and peripheral portions thereof, the sprocket disk member being interposed between the said chambers; a driving connection between the crank pedal and the outer disk member, one or more shafts mounted in the sprocket disk member transversely thereof and having its ends projecting into the said annular chambers, a gear rigid with one of the chambered disk members, within the chamber thereof and spaced from the peripheral portion of said member and concentric with the first mentioned shaft; an internal gear rigid with the other chambered disk member, within the chamber thereof, and also concentric with the first-mentioned shaft and spaced radially outwardly from the first-mentioned gear; pinions on the opposite ends of each of the shafts mounted in the sprocket disk member and each meshing with the gear within the chamber wherein it is located; movable means forming a connection between the sprocket disk member and the inner disk member; and means adapted to break the aforesaid connection and to anchor the inner disk member against rotation.

5. The combination, with the crank hanger, crank shaft and pedal crank of a bicycle, of a change-speed sprocket assembly mounted upon said shaft, the said sprocket assembly comprising an outer disk member having an annular chamber formed between the central and peripheral portions thereof; a sprocket disk member; and an inner disk member also having an annular chamber formed between the central and peripheral portions thereof, the outer portion of the sprocket disk member being interposed between the said chambers; a driving connection between the crank pedal and the outer disk member; one or more shafts mounted in the sprocket disk member transversely thereof and each having its ends projecting into the said annular chambers; a gear rigid with one of the chambered disk members, within the chamber thereof, and spaced from the peripheral portion of said member and concentric with the first-mentioned shaft; an internal gear rigid with the other chambered disk member, within the chamber thereof, and also concentric with the first-mentioned shaft and spaced radially outwardly from the first-mentioned gear; pinions on the opposite ends of each shaft mounted in the sprocket disk member and each meshing with the gear within the chamber wherein it is located; movable means connecting the sprocket disk member with the inner disk member, said means comprising a pin slidably supported by the sprocket disk member and adapted to enter an opening provided therefor in the inner disk member; and a plunger carried by the bicycle frame and adapted to enter the said opening thereby to remove the pin therefrom and to anchor the inner disk member against rotation.

6. In the combination recited in claim 4, the first-mentioned gear being located within the annular chamber formed in the outer disk member and the second mentioned gear being located within the chamber formed in the inner disk member.

7. In the combination recited in claim 5, spring means carried by the sprocket disk member and tending to force the pin into the opening provided therefor in the inner disk member, and a spring tending to force the plunger toward the inner disk member.

8. The combination, with the crank hanger, crank shaft and pedal crank of a bicycle, of a change-speed sprocket assembly mounted upon said shaft, the said sprocket assembly comprising an outer disk member having an annular chamber formed between the central and peripheral portions thereof; a sprocket disk member; and an inner disk member also having an annular chamber formed between the central and peripheral portions thereof, the outer portion of the sprocket disk member being interposed between the said chambers; a driving connection between the crank pedal and the outer disk member; one or more shafts supported by the sprocket disk member intermediate the peripheral and inner portions of the chambers in the inner and outer disk members; gears carried respectively by the inner and outer disk members within the chambered portions thereof; and pinion means mounted on each of the last-mentioned shafts and adapted to mesh with the said gears; movable means connecting the sprocket disk member with the inner disk member; and means mounted on a portion of the bicycle frame adapted to break the aforesaid connection and to anchor the inner disk member against rotation.

9. The combination, with the crank hanger, crank shaft and pedal crank of a bicycle, of a change-speed sprocket assembly mounted upon said shaft, the said sprocket assembly comprising an intermediate sprocket disk member, an outer disk member on the outer side of the sprocket disk member, an inner disk member on the inner side of the sprocket disk member, a driving connection between the pedal crank and the outer disk member, gears carried by the inner disk member and the outer disk member, pinions rotatably supported by the sprocket disk member and meshing with the aforesaid gears, movable means for effecting a driving connection between the sprocket disk member and the inner disk member, and means for breaking the aforesaid connection and for anchoring the inner disk member against rotation.

10. The combination, with the crank hanger, crank shaft and pedal crank of a bicycle, of a change-speed sprocket assembly mounted upon said shaft, the said sprocket assembly comprising an outer disk member having an annular chamber formed between the central and peripheral portions thereof; a sprocket disk member; and an inner disk member also having an annular chamber formed between the central and peripheral portions thereof, the outer portion of the sprocket disk member being interposed between the said chambers; a driving connection between the crank pedal and the outer disk member; one or more radially extending shafts mounted on the sprocket disk member within the chambered portions of the other disk members; a pinion mounted on each of the said shafts; a gear carried by the outer disk member and a gear carried by the inner disk member, within the chambered portions thereof and engaged by said pinion or pinions; movable means for effecting a driving connection between the sprocket disk member and the inner disk member; and means adapted to break the aforesaid connection and to anchor the inner disk member against rotation.

11. In the combination recited in claim 10, the aforesaid gears being formed in the side walls of the respective chambers of the outer and inner disk members.

12. A variable speed sprocket assembly for bicycles comprising an outer disk member, an intermediate disk member, and an inner disk member, one of said members having sprocket teeth and the said members having central openings therethrough for the passage of a shaft, there being annular chambers provided between the first and third disk members and the intermediate member, said chambers being located on opposite sides of the intermediate disk member, one or more shafts extending transversely of and mounted in the intermediate disk member with their ends projecting into the said chambers, a gear carried by one of the chambered disk members within the chamber thereof and concentric with the axis thereof, an internal gear carried by the other chambered disk member within the chamber thereof and concentric with the axis thereof and spaced radially outwardly from the former gear, pinions mounted on the opposite ends of said shaft or shafts and located in the said chambers and cooperating with said gears respectively, and movable means connecting the intermediate disk member with one of the other disk members, whereby the last mentioned disk member may be held against rotation.

13. In the sprocket assembly set forth in claim 12, the movable means connecting the intermediate member with one of the other members comprising a pin slidably supported by the intermediate disk member and an opening in the cooperating disk member for the reception of said pin, and a spring for yieldingly pressing said pin toward said cooperating disk member.

FREDERICK S. TRAVIS.